March 7, 1961  G. A. LYON  2,973,736
METHOD OF MAKING A WHEEL COVER
Filed Nov. 23, 1955  3 Sheets-Sheet 1
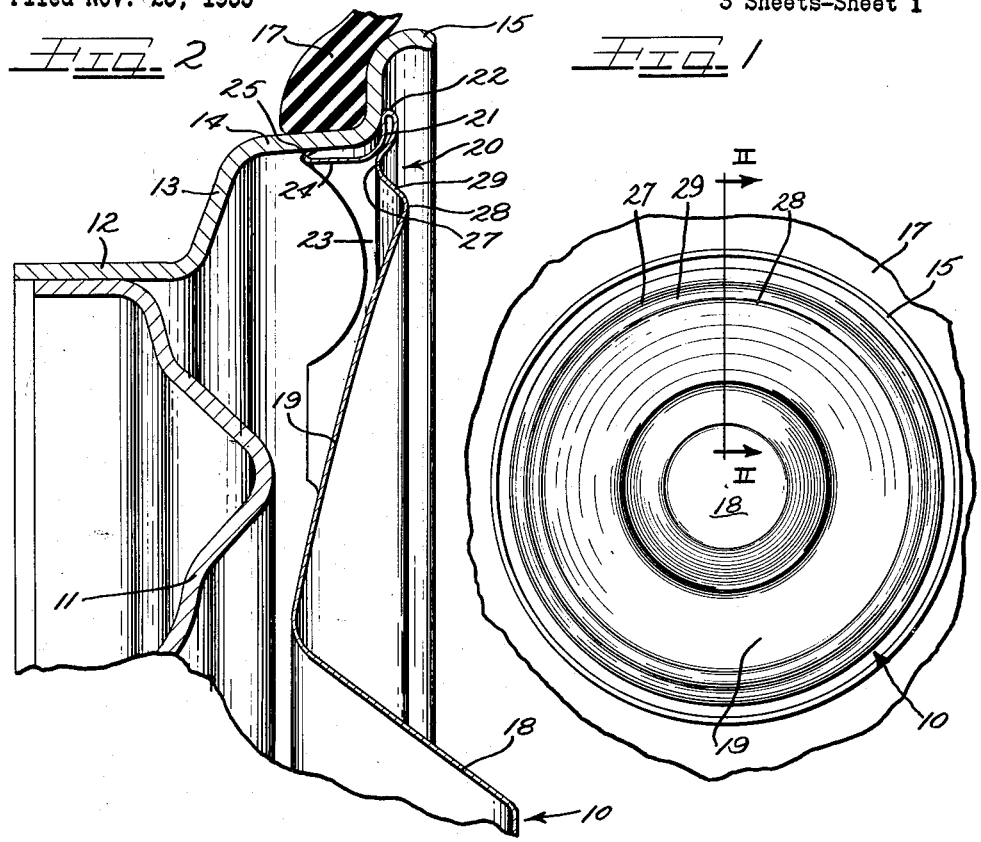
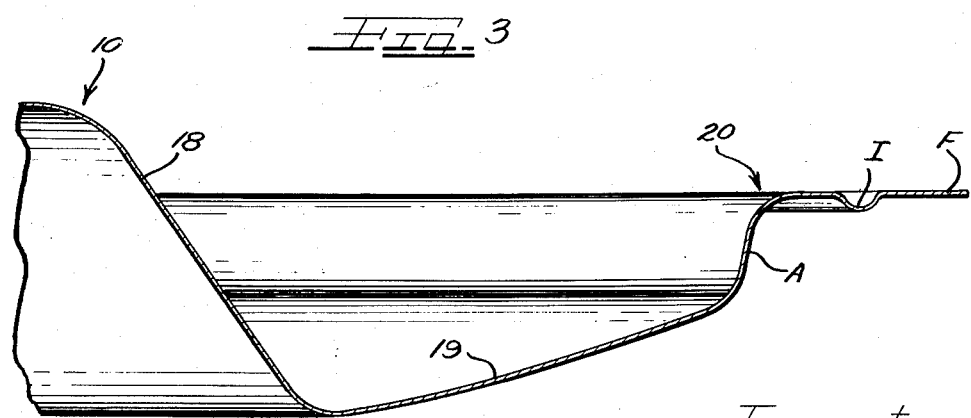
Inventor
GEORGE ALBERT LYON

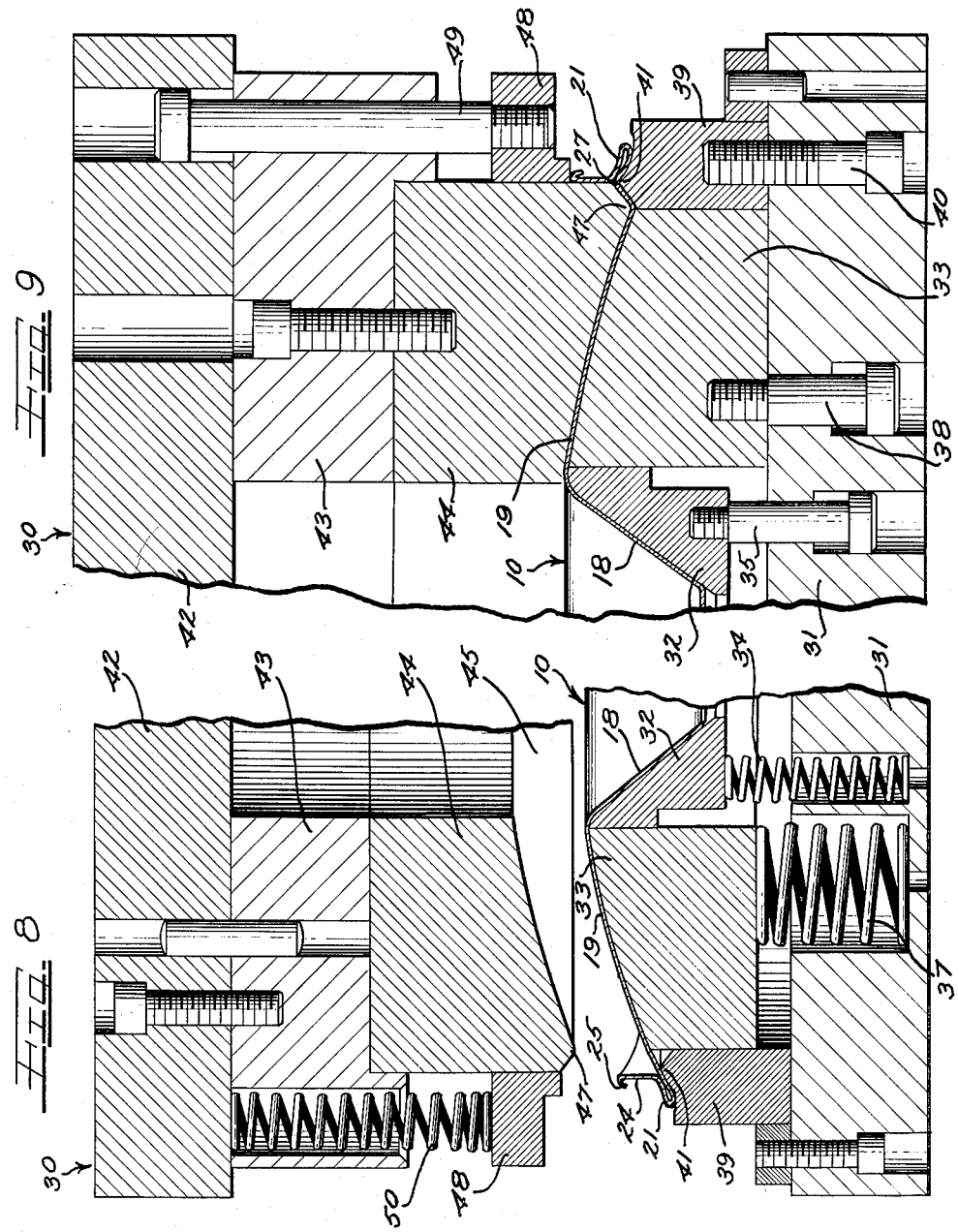

United States Patent Office 2,973,736
Patented Mar. 7, 1961

2,973,736

METHOD OF MAKING A WHEEL COVER

George Albert Lyon, 13881 W. Chicago Blvd., Detroit 28, Mich.

Filed Nov. 23, 1955, Ser. No. 548,709

7 Claims. (Cl. 113—116)

The present invention relates to improvements in making wheel covers from sheet metal and adapted for disposition in covering relation to the outer sides of vehicle wheels.

An important object of the present invention is to provide an improved method of making wheel covers to provide the same with a novel reinforcement structure in conjunction with retaining flange structure.

Another object of the invention is to provide in a self retaining sheet metal vehicle wheel cover an improved work hardened retaining flange and marginal structure.

A further object of the invention is to provide an improved method of making a reinforced, work hardened marginal structure in conjunction with cover retaining flange means on a vehicle wheel cover.

Other objects, features and advantages of the present invention will be readily apparent from the following detailed description of a preferred embodiment thereof taken in conjunction with the accompanying drawings in which:

Figure 1 is an outer side elevational view of a wheel structure embodying features of the invention;

Figure 2 is an enlarged fragmentary radial sectional view taken substantially on the line II—II of Figure 1;

Figure 3 is a fragmentary radial sectional view through a cover blank in a preliminary stage in a method of making the same;

Figure 8 is a fragmentary vertical diametrical sectional view through die assembly for completing and work hardening the cover, with the die shown in the open condition thereof; and Figure 9 is a fragmentary vertical sectional view similar to Figure 8 but showing the die assembly in the closed, cover margin working condition of the die assembly.

Figure 4:
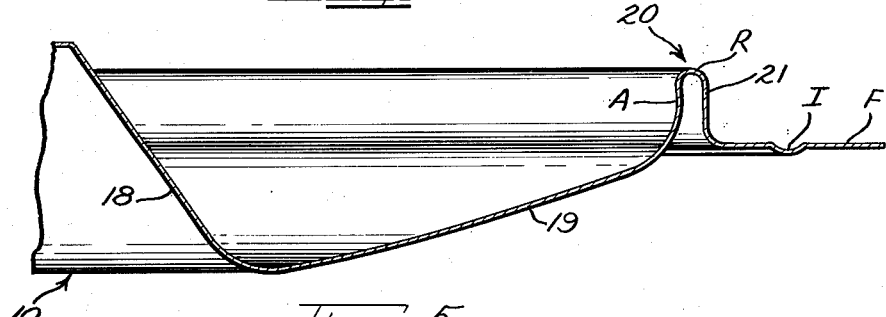
Figures 4, 5, 6 and 7 show respective additional stages through which the cover blank progresses in the method of making the same according to the present invention.
Figure 5:
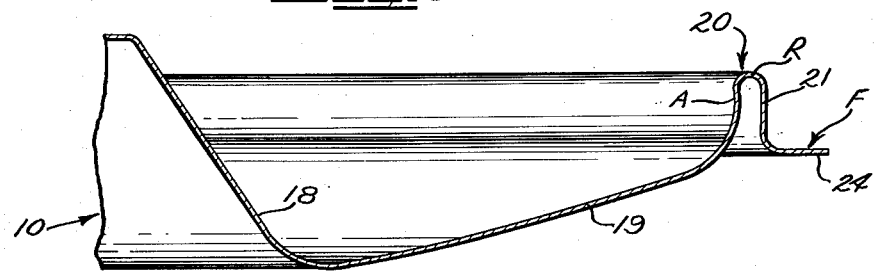

A cover 10 according to the present invention is constructed and arranged for disposition at the outer side of a vehicle wheel including a wheel body 11 supporting a multiflange drop center tire rim including a base flange 12, a generally radially outwardly projecting and axially outwardly facing side flange 13 merging with a generally radially inwardly facing annular intermediate flange 14 that leads at its axially outer side into a terminal flange 15. The tire rim is adapted to support a pneumatic tire and tube or a tubeless tire 17.

As shown, the cover 10 comprises a full disk cover that is adapted to overlie entirely the wheel body 11 and a substantial portion of the tire rim. To this end, the cover 10 includes a central crown portion 18 merging with an intermediate annular inwardly dished portion 19 that extends from the crown radially outwardly to an annular cover margin 20 which in assembly with the wheel overlies the tire rim and more particularly the intermediate flange 14 and the adjacent portion of the terminal flange 15. The material of the cover 10 comprises a suitable gauge sheet metal such as stainless steel, brass aluminum alloy, or the like susceptible of cold drawing and working.

According to the present invention, the cover margin 20 is provided with means for retaining the cover on the wheel in press-on, pry-off relation and is constructed to afford work hardened, resilient structure. By preference the cover retaining means comprises a structure substantially according to my Patent 2,624,634 issued January 6, 1953. This includes an underturned annular generally radially inwardly extending marginal flange 21 providing at juncture thereof with the edge of the cover a reinforcing and finishing bead-like annular edge 22.

In assembly with the wheel, the underturned flange 21 is adapted to bear against the terminal flange 15 adjacent juncture with the intermediate flange 14 and projects radially inwardly beyond such juncture to a generally axially inwardly extending annular flange extension portion 23 which is adapted to lie in radially inwardly spaced relation generally telescoped within the axially outer portion of the intermediate flange 14. At suitable intervals such as eight to sixteen, the flange extension portion 23 is provided with generally axially inwardly extending retaining finger extensions 24 provided with short and stiff generally radially and axially outwardly extending oblique retaining finger terminals 25 that are engageable edgewise in retaining gripping relation against the inner surface of the intermediate flange 14. Normally the retaining fingers 24 and more particularly the terminals 25 thereof project to a slightly greater diameter than the diameter of the engaged portion of the intermediate flange 14 so that upon pressing the cover axially inwardly onto the wheel, the retaining fingers 24 are flexed resiliently radially inwardly as the retaining terminals 25 cam along the slope of the intermediate flange 14 into the ultimate retaining gripping engagement with the rim flange.

As the retaining fingers 24 are flexed resiliently radially inwardly, about the entire perimeter of the cover, the flange portion 23 is also resiliently flexed for mutually resiliently tensioning the retaining fingers 24. Such tensioning and flexing action of the flange portion 23 is also reflected in flexing of the underturned flange 21 and a tensioning of the overlying portion of the cover margin 20.

Since tensioning of the retaining fingers 24 is an important factor in affording efficient cover retaining thrust of the retaining terminals 25 against the tire rim flange 14, means are provided in the cover margin 20 for stiffening the same and enhancing the resilient tensioning action of the cover marginal structure relative to the retaining fingers 24. To this end an annular reinforcing rib 27 is provided in the cover margin 20 projecting generally axially inwardly and backed up against the juncture of the flange portions 21 and 23, as indicated at 30. Radially inwardly contiguous the indented rib 27 is a generally axially outwardly projecting annular reinforcing rib 28. These ribs 27 and 28 afford a generally corrugated appearance to the cover margin 20 and mutually cooperate to reinforce and resiliently stiffen the cover margin.

It will also be observed that the reinforcing ribs 27 and 28 are disposed in substantially direct shouldering thrust alignment with the retaining flange juncture shoulder 30 and that a connecting flange 29 that provides the radially inner side of the rib 27 and the radially outer side of the rib 28 is in reinforcing strut relation to the retaining flange juncture shoulder in a plane obliquely intersecting the generally axial plane of the retaining fingers 24, the flange 29 extending generally radially outwardly and axially inwardly toward the retaining flange juncture shoulder 30. Thus, as the retaining fingers 24 and thus the flange 23 are deflected resiliently radially inwardly the retaining flange structure is backed up and fulcrums upon the rib 27, thereby substantially stiffening the action of the fingers as they ride home along the intermediate flange 14.

In addition, of course, the reinforcing rib structure of the cover margin 20 affords substantial advantage in that during pry-off when a pry-off tool such as a screwdriver is applied behind the turned under edge 22 and the flange 21 and pry-off force supplied, the cover margin is highly resistant to undesirable deformation or damage.

By preference, the cover 10 is shaped by drawing the same substantially according to the method described and covered in my Patent No. 2,707,449 issued May 3, 1955, up to the point where the present invention is applied thereto.

As the first step in drawing the cover (Fig. 3) the crown portion 18 and the intermediate portion 19 are generally formed, while the cover margin 20 is in the form of a generally axially outwardly extending flange A and a flat radially extending flange F with a reverse bend cold worked indentation I formed in the flange F by cold working rib and channel structure through which the marginal portion of the cover blank is drawn inwardly during drawing of the portions of the cover radially inwardly therefrom.

Then, as shown in Figure 4, the cover blank 10 is further worked and the flange F is folded in at its radially inner portion toward and into spaced opposition relative to the flange portion A, thereby providing an axially outwardly projecting annular rib R which is hollow and opens toward the inner side of the cover blank. This provides the basis for at least the flange 21 of the cover margin 20.

Figure 6:
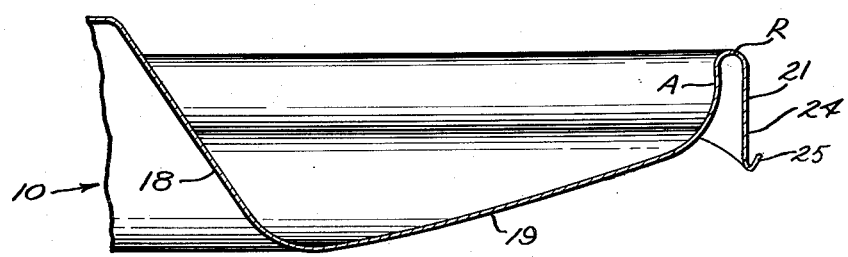

In the next step in fabrication, the flange F is trimmed to provide the retaining finger extensions 24. Immediately thereafter (Fig. 6), the retaining finger extensions are worked into axially inward continuations of the flange 21 and the retaining finger terminal flanges 25 are formed. This is followed by radially outward turning of the rib R and collapsing thereof, thereby bending the flange 21 angularly relative to the flange portion 23 and merging the inner leg flange A of the rib R into the dished intermediate cover surface portion 19.

Figure 7:
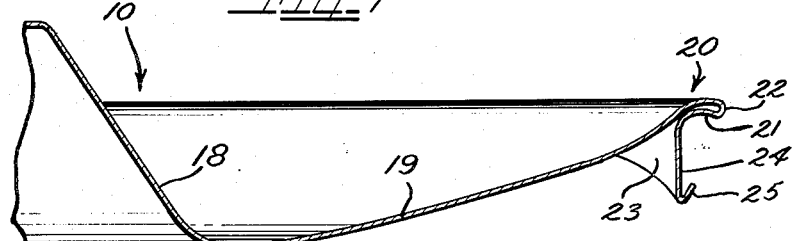

As the final forming step in making the cover 10, the marginal corrugated rib structure is cold worked into the marginal portion 20 of the cover. This is accomplished in die apparatus as shown in Figures 8 and 9. For this purpose, a lower or base die block or plate 31 is provided which is adapted to be mounted upon the anvil of a sheet metal drawing press. Supported by the base member 31 are respective coaxially disposed ring die members 32 and 33 which are engageable with respectively the crown portion 18 and the intermediate portion 19 of the cover supported thereon in inverted position following the method step described in connection with Figure 7. Compression springs 34 and guide pins 35 normally urge and guide the ring die member 32 into an elevated position above the base member 31 as shown in Figure 8. Similarly, the ring die member 33 is urged and guided into elevated relation to the base member 31 by springs 37 and pins 38, respectively.

Slidably encircling and guiding the die ring 33 is an upstanding cover margin supporting and forming die ring 39 which is fixedly attached to the base block or plate 31 as by means of screws 40. Upon its upper surface, the ring die member 39 is contoured to provide a rib 41 of annular form and cross-sectionally shaped complementary to the groove which defines the axially outer side of the indented rib 27 to be formed in the cover margin.

Cooperatively related to the lower portion of the die set 30 is an upper portion including a head plate or block 42 arranged to be secured to the ram of the press and carrying a removable bolster block 43 to which is removably secured a forming die ring 44 which has a downwardly facing surface 45 shaped complementary to the inner surface of the intermediate cover portion 19 so as to be engageable in clamping relation thereto cooperatively with the lower upwardly resiliently biased die ring member 33. At the radially outer margin of the lower face of the die ring member 44 is provided an annular depending forming rib 47 which is complementary to the axially inwardly facing groove defined by the cover rib 28 to be formed. As a result, when the press ram is driven toward the anvil, with a cover blank between the die portions, as shown in Figure 8, the die ring members 33 and 44 grip the intermediate cover portion 19 therebetween and carry the same downwardly as the forming ribs 41 and 47 cooperate to work the cover margin to draw the same into the marginal ribs 27 and 28 (Fig. 9). It will be observed that the radially inner side of the forming rib 41 and the radially outer side of the forming rib 47 of the die members are complementary for shaping the intermediate annular rib flange 29 therebetween.

As an incident to movement of the upper ring die member 44 toward the lower die portion, an annular floating ring die member 48 slidably disposed thereabout and normally urged to the limit of headed guide pins 49 by light biasing springs 50 engages upon the upwardly directed ends of the retaining fingers 24 at juncture of the terminal flanges 25 with the body portions of the fingers and holds the fingers substantially against distortion in an axial direction. Furthermore, after the marginal rib drawing operation, as the upper portion of the die assembly is backed off, the ring die member 48 acts as a stripper to assure release of the ring die member 44 from the finished cover since at its outer periphery it fits closely into telescopic relation within the retaining fingers 24 and the flange portion 21 which may be thoroughly snugly drawn thereagainst as an incident to the cold working and drawing of the cover margin as the marginal ribs are formed therein. As a result of the firm grip upon the intermediate cover portion 19 between the die ring members 33 and 44 during the marginal rib drawing coaction of the forming ribs 41 and 47, freedom from distortions or wrinkling in the intermediate portion 19 is assured.

As the upper portion of the die assembly 30 is backed off, the ring dies 33 and 32 shift the formed cover 10 upwardly with the margin 20 above the ring die 39 to enable ready engagement of the cover margin for removal from the die assembly.

It will be readily apparent that in addition to the substantial cold working to which the cover margin is subjected during the initial drawing steps through collapsing and outward turning of the rib R substantial work hardening and resilience is imparted to the marginal structure and the retaining flange and fingers. Then, as a result of the additional working of the material of the cover margin adjacent to the portion of the margin derived from turning over of the rib R, there is substantial extension of the cold working hardness and resilience through at least the rib side flange 29. This substantially enhances the reinforcing effectiveness of the reinforcing ribs in the cover margin.

It will be understood that modifications and variations may be effected without departing from the scope of the novel concepts of the present invention.

I claim as my invention:

1. In a method of making a wheel cover, the steps of drawing a sheet metal blank to provide a body portion and a marginal narrow hollow annular rib projecting axially from the outer face of the cover with a radially outwardly extending flange structure thereabout, converting the radially outwardly extending flange structure from the angular relation to the radially outer side leg of said rib into an axially inwardly directed extension of the outer leg of the rib by working and elongating the flange structure progressively in the axially inward direction behind the margin of the cover, substantially collapsing and radially outwardly turning the rib, and then cold work drawing an annular rib in the cover margin radially inwardly adjacent to the inner side of what was the leg of said hollow annular rib before it was turned outwardly as aforesaid.

2. In a method of making sheet metal wheel covers, shaping a cover blank to provide an intermediate annular generally dished portion with an axially outwardly projecting annular rib thereabout, cold work drawing cover retaining flange structure at the outer side of said rib and cold working said rib into collapsed generally radially outwardly directed position overlying the retaining structure and with the radially inner leg of the rib merging into said intermediate portion, and thereafter as an additional step cold work hardening and drawing an annular area at juncture of the intermedite portion and the radially inner leg of the rib.

3. In a method of making sheet metal wheel covers, shaping a cover blank to provide an intermediate annular generally dished portion with an axially outwardly projecting annular rib thereabout, cold work drawing cover retaining flange structure at the outer side of said rib and cold working said rib into collapsed generally radially outwardly directed position overlying the retaining structure and with the radially inner leg of the rib merging into said intermediate portion, and thereafter as an additional step cold work hardening and drawing an annular area at juncture of the intermediate portion and the radially inner leg of the rib and in such cold working shaping an indented rib into the cover margin.

4. In a method of making sheet metal wheel covers, shaping a cover blank to provide an intermediate annular generally dished portion with an axilly outwardly projecting annular rib thereabout, cold work drawing cover retaining flange structure at the outer side of said rib and cold working said rib into collapsed generally radially outwardly directed position overlying the retaining structure and with the radially inner leg of the rib merging into said intermediate portion, and thereafter as an additional step cold work hardening and drawing an annular area at juncture of the intermediate portion and the radially inner leg of the rib and in such cold working shaping a generally axially inwardly indented and a generally axially outwardly projecting rib in the cold worked area.

5. In a method of making sheet metal wheel covers, shaping a sheet metal blank into an annular generally dished portion with a generally radially outwardly projecting marginal portion with an underturned flange having cover retaining means thereon, and cold working the marginal portion into an oblique generally radially outwardly and axially inwardly extending annular thrust shoulder flange directed toward said underturned flange.

6. In a method of making sheet metal wheel covers, drawing a sheet metal blank into an intermediate dished portion and an outer marginal portion provided with an underturned flange with cover retaining means thereon, and then, after the cover has been completed up to this point, as an additional step displacing an annular portion of said dished portion adjacent to said underturned flange into a generally axially outwardly projecting annular reinforcing rib.

7. The method of making sheet metal wheel covers wherein a cover blank includes a generally dished intermediate annular portion and a margin having an underturned flange with cover retaining means extending therefrom, the steps of relatively displacing a marginal extremity portion of the cover blank and a radially inner portion of the dished portion of the blank, and shaping an annular reinforcing rib in the cover between said extremity and said intermediate portion as an incident to such displacement.

References Cited in the file of this patent

UNITED STATES PATENTS

| | | |
|---|---|---|
| 2,282,588 | Lyon | May 12, 1942 |
| 2,624,634 | Lyon | Jan. 6, 1953 |
| 2,664,318 | Lyon | Dec. 29, 1953 |
| 2,689,539 | Lyon | Sept. 21, 1954 |
| 2,700,354 | Lyon | Jan. 25, 1955 |
| 2,707,449 | Lyon | May 3, 1955 |
| 2,761,408 | Lyon | Sept. 4, 1956 |